United States Patent
Esseghir et al.

(10) Patent No.: US 6,565,784 B1
(45) Date of Patent: May 20, 2003

(54) TELECOMMUNICATIONS CABLE COMPOSITION PROCESS

(75) Inventors: Mohamed Esseghir, Dayton, NJ (US); Alex Kharazi, Somerset, NJ (US); John Francis Wojdyla, Jackson, NJ (US); Sean Gerard Duffy, Highbridge, NJ (US); Thomas Shiaw-Tong Lin, Whippany, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 285 days.

(21) Appl. No.: 09/585,698

(22) Filed: Jun. 1, 2000

(51) Int. Cl.⁷ .............................................. B29C 47/00
(52) U.S. Cl. ................... 264/141; 264/211.23
(58) Field of Search ....................... 264/211.21, 211.23, 264/172.11, 172.13, 140, 141, 142, 143, 37.26

(56) References Cited

U.S. PATENT DOCUMENTS

| | | | | |
|---|---|---|---|---|
| 4,353,851 A | * | 10/1982 | Godfrey et al. | 264/140 |
| 5,102,591 A | * | 4/1992 | Hasson et al. | 264/211.23 |
| 5,374,387 A | * | 12/1994 | Barnes et al. | 264/211.23 |
| 5,711,904 A | * | 1/1998 | Eswaran et al. | 264/211.23 |
| 5,876,647 A | * | 3/1999 | Makise et al. | 264/211.23 |

\* cited by examiner

*Primary Examiner*—Mark Eashoo
*Assistant Examiner*—Geoffrey P. Shipsides

(57) ABSTRACT

A process for the preparation of a composition useful in telecommunications jacketing comprising:

(i) introducing a polyolefin into the first mixing zone of a melt/mixer having first and second mixing zones;

(ii) introducing particulate carbon black per se or a premix of said carbon black and polyolefin into the first mixing zone, said carbon black being in an amount of about 2 to about 50 percent based on the weight of the polyolefin introduced into the first mixing zone;

(iii) melting the polyolefin in the presence of the carbon black in the first mixing zone;

(iv) mixing the carbon black and the molten polyolefin in the first mixing zone to provide a molten mixture;

(v) passing the molten mixture from step (iv) into the second mixing zone;

(vi) adding sufficient polyolefin to the molten mixture from step (v) to dilute the carbon black to a level of about 2 to about 3 percent by weight based on the weight of the total polyolefin in the melt/mixer;

(vii) mixing the added polyolefin with the molten mixture in the second mixing zone to provide a molten mixture;

(viii) about simultaneously with step (vii), venting the second mixing zone;

(ix) recovering the mixture from step (vii); and (x) optionally, pelletizing the mixture from step (ix).

8 Claims, No Drawings

TELECOMMUNICATIONS CABLE COMPOSITION PROCESS

TECHNICAL FIELD

This invention relates to a process for the preparation of compositions useful in the production of jacketing for telecommunications cables or of pipe products.

BACKGROUND INFORMATION

A typical telecommunications cable generally comprises one or more conductors, e.g., copper or glass fiber, in a cable core that is surrounded by at least two layers of polymeric material including an insulating layer and a jacketing layer, which usually contains carbon black.

In order to prepare the jacketing composition, carbon black is generally fed into the feed hopper of a melt/mixer or an extruder along with a resin and other additives. Carbon black, however, is a low bulk density material, which tends to bridge or flood feed hoppers when introduced at typical loadings of, for example, 30 percent by weight at elevated feed rates, i.e., at rates above 2000 pounds per hour (pph) in a 200 millimeter Buss™ co-kneader or 1000 pph in a 140 millimeter Buss™ co-kneader. In addition to bridging or flooding, the high loading can lead to excessive temperatures, which tend to decompose some of the standard additives, and cause degradation of the product. The surge of the feed due to the bridging or flooding can lead to variations in composition viscosity, which, in turn, can lead to excessive power draw fluctuations on the mixer motor, temperature variations at the die plate, and pressure fluctuation upstream of the die pack. The surge also causes a quick build-up of particulates resulting in plugged screen packs and increased pressure, and eventually mixer shut down. Finally, it is found that when the composition is extruded around a wire or core of wires (or glass fibers), the coating is rough rather than smooth.

To solve this problem, a mixture containing the resin, additives, and 30 to 50 percent by weight carbon black is introduced into a high shear mixer, generally off-line, to disperse the carbon black and other additives throughout the resin, and provide what is referred to as a masterbatch. Then, a separate let-down process is carried out in a melt-mixer wherein the masterbatch is diluted with a base resin to provide a homogeneous final product, i.e., a jacketing composition, containing about 2 to 4 percent by weight carbon black. The final product is often in the form of pellets ready for extrusion, storage, or shipping to customers, who will convert the pellets to a cable jacket.

In an attempt to lower costs while improving the quality of the pelleted product, i.e., a product with an improved dispersion of carbon black, industry is looking for an efficient in-line process in which the masterbatch process and let-down process are combined.

DISCLOSURE OF THE INVENTION

An object of this invention, therefore, is to provide a two-in-one process for the preparation of compositions useful in the production of telecommunications jacketing and pipe products and, which, in addition, improves the dispersion of the carbon black throughout the composition. Other objects and advantages will become apparent hereinafter.

According to the invention, a process has been discovered for the preparation of a composition useful in telecommunications jacketing comprising:

(i) introducing a polyolefin into the first mixing zone of a melt/mixer having first and second mixing zones;

(ii) introducing particulate carbon black per se or a premix of said carbon black and polyolefin into the first mixing zone, said carbon black being in an amount of about 2 to about 50 percent based on the weight of the polyolefin introduced into the first mixing zone;

(iii) melting the polyolefin in the presence of the carbon black in the first mixing zone;

(iv) mixing the carbon black and the molten polyolefin in the first mixing zone to provide a molten mixture;

(v) passing the molten mixture from step (iv) into the second mixing zone;

(vi) adding sufficient polyolefin to the molten mixture from step (v) to dilute the carbon black to a level of about 2 to about 3 percent by weight based on the weight of the total polyolefin in the melt/mixer;

(vii) mixing the added polyolefin with the molten mixture in the second mixing zone to provide a molten mixture;

(viii) about simultaneously with step (vii), venting the second mixing zone;

(ix) recovering the mixture from step (vii); and (x) optionally, pelletizing the mixture from step (ix).

DESCRIPTION OF THE PREFERRED EMBODIMENT(S)

Polyolefin, as that term is used herein, is a thermoplastic resin, which may be crosslinkable. It can be a homopolymer or a copolymer produced from two or more comonomers, or a blend of two or more of these polymers, conventionally used in film, sheet, tubing, and pipe and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotri-fluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. Included in this preferred group are terpolymers such as ethylene/propylene/diene monomer rubbers.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. Polypropylene can be prepared by conventional processes such as the process described in U.S. Pat. No. 4,414,132. Preferred polypropylene alpha-olefin comonomers are those having 2 or 4 to 12 carbon atoms.

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.870 to about 0.945 gram per cubic centimeter. They also can have a melt index in the range of about 0.02 to about 50 grams per 10 minutes and a melt flow ratio in the range of about 20 to about 200.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter, and metallocene copolymers with densities less than 0.900 gram per cubic centimeter. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methaciylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms, The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear. The LLDPE, however, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 0.1 to about 20 grams per 10 minutes, and is preferably in the range of about 0.4 to about 1 gram per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 0.1 to about 5 grams per 10 minutes, and preferably has a melt index in the range of about 0.2 to about 3 grams per 10 minutes. Melt index is determined under ASTM D-1238, Condition E. It is measured at 190 degrees C. and 2160 grams.

Conventional additives, which can be introduced into the composition, are exemplified by antioxidants, organic peroxides, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from less than about 0.1 to more than about 50 percent by weight based on the weight of the composition.

The carbon black suitable for the process of this invention can have a surface area of about 20 to about 1500 square meters per gram. In order to provide good weatherability for the jacketing compounds used in telecommunications cable, it is generally necessary to incorporate particulate carbon black into the composition. The industry standard for telecommunication cable requires the use of less than or equal to 20 nm average particle size for the carbon black and a carbon black content of 2.6 percent +0.25. The surface area is determined under ASTM D 4820-93a (Multipoint B.E.T. Nitrogen Adsorption). Examples of carbon black are furnace black, acetylene black, and Ketjen black.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline, 4,4'-bis(alpha,alpha-demthylbenzyl) diphenylamine, and alkylated diphenylamines. Antioxidants can be used in amounts of about 0.1 to about 5 percent by weight based on the weight of the composition.

It will be understood that the process of the invention is a compounding process. Compounding can be effected in a conventional melt/mixer or in a conventional extruder adapted for the process, and these terms are used in this specification interchangeably. Generally, the composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names. In the present case, the important zones are the first and second mixing zones. The first mixing zone can be considered to be a melt/mixing zone since the resin is melted in this zone. In this zone, the polymer is melted in the presence of the carbon black. In the second zone, the molten resin from the first mixing zone contributes substantially to the melting of the added solid resin. Temperature-wise, a lower level of mechanical energy is required in the second mixing zone to maintain the mixture in the molten state while it is being mixed thus resulting in an overall lowering of the product temperature. An important feature in the second mixing zone is the venting means, which can be provided by one or more ports. The venting takes place prior to mixer discharge, and is believed to reduce the possibility of return gases, and improve the feeding of the additional resin to the second mixing zone, thus allowing production at increased rates.

Various types of melt/mixers and extruders such as a Brabender™ mixer, Banbury mixer, a roll mill, a Buss™ co-kneader, a biaxial screw kneading extruder, and single or twin screw extruders can be adapted to carry out the process of the invention. A description of a conventional extruder can be found in U.S. Pat. No. 4,857,600. In addition to melt/mixing, the extruder can be used to coat a glass fiber or a copper wire or a core of glass fibers or copper wires. An example of co-extrusion and an extruder therefor can be found in U.S. Pat. No. 5,575,965.

It would be preferable to use the new generation "long" continuous compounding mixers such as the Kobe™ LCM mixer or the Farrel™ ADVEX-D™ mixer. The characteristics of these mixer designs are that they are typically 10 L/D long and are configured in two stage mixing chambers. The two stages are separated by an adjustable gate/orifice. The beginning of the second stage is usually provided with a "decompression zone" and a vent port. The rotor configuration and chamber-dam configuration are manipulated to the effect that the two stages can be considered to be two independent mixing zones.

The process as described in steps (i) to (iv) can be conceivably achieved by using a mixer which would prepare an in-line masterbatch. The first zone of such a mixer would use a relatively smaller, high shear, low rate rotor section. However, such approach, which would use 30 to 50 percent by weight carbon black, would require substantially high dilution in the second zone to achieve the final product formulation. Therefore, the rate of neat resin required in the second zone would be very high. Such process would probably require a mixer with rotors of substantially larger diameter in the second zone to enable it to take up such a rate. Such mixer is not currently an industry standard, however.

The feed rates in the process of the invention are dependent on the volumetric size of the machine. Existing commercial systems are generally capable of about 400 pph (pounds of resin per hour), to about 100,000 pph. The residence time in the first mixing zone can be about 5 to about 15 seconds and in the second mixing zone about 3 to about 10 seconds depending on the production rates for a given machine size and rotor geometry. The resin for the first mixing zone can be added through a first feed port and for the second mixing zone through a second feed port. The second feed port and the vent port in the second mixing zone can be the same if desired. Since it is desirable to have a melt/mixer with high capacity, the mixer rotor or rotors configurations will be designed to ensure good dispersion and appropriate intake capacity, especially regarding the second feed.

The amount of carbon black introduced in step(ii) can be in the range of about 2 to about 50 percent by weight based on the weight of the polyolefin. It is preferably in the range of about 5 to about 15 percent by weight. It will be understood that other additives can be pre-mixed with the resin or added in steps (i) and/or (ii) and/or (vi). The usual additives are antioxidants.

The temperature in the first mixing zone is, of course, at least as high as the melting point of the resin. It is generally in the range of about 150 to about 320 degrees C., preferably in a range suitable for maintaining the polymer's thermal stability. As noted, the molten resin flowing from the first mixing zone contributes substantially to the melting of the added solid resin in the second mixing zone. However, the temperature in the second mixing zone is sufficient to maintain good melt mixing and homogenization. Mixing speeds are selected to impart sufficient mechanical energy to meet product mixing quality requirements. Existing commercial machines have capabilities of about 10 to about 1200 revolutions per minute (rpm). Typical specialty compounding is conducted with machines running at about 150 to about 500 rpm. As noted, the process can be carried out in a single two-stage process or in two separate stages, i.e., steps (i) to (iv) in the first stage and steps (v) to (x) in the second stage. A variation of the latter process is the cascading of the masterbatch [steps (i) to (iv)] prepared in a first high shear mixer in the form of a molten "rope" into a second mixer where the additional resin is added. In this approach the first mixer is usually significantly smaller in size than the second mixer. Conventional two mixer techniques produce low throughput with high quality masterbatch in the first mixer and high throughput with high quality final product in the second mixer. This process, however, requires a high quality masterbatch, which limits production rates. The single process, on the other hand, can be utilized where both quality and rates are the prime motivators.

In step (vi), the remaining polymer resin can be introduced in an amount in the range of about 25 to about 80 percent by weight based on the weight of the total polyolefins in the melt/mixer, and preferably is in the range of about 50 to about 70 percent by weight, in order to provide, by dilution, a total weight of carbon black in the range of about 2 to about 3 percent by weight, and preferably about 2.35 to about 2.85 percent by weight, again based on the weight of the polyolefin.

In step (ix), the mixture is recovered, and is either pelletized as in step (x), or the extrusion process is carried out in a conventional manner coating a glass fiber or copper wire or a core of either.

Typical telecommunications jacketing compositions can be constituted as follows (by weight):

polyolefin: about 96 to about 99 percent;
carbon black: about 1 to about 3 percent; and
antioxidants: about 0.1 to about 3 percent.

The advantages of the invention lie in lower process and equipment costs; in compositions useful in the preparation of plastic pipe can also be made using the process of this invention; at equivalent rates, the resultant jacketing and pipe exhibits equivalent or better ultraviolet light and weathering stability in addition to enhanced physical properties due to the fine dispersion and uniform distribution of the carbon black forming a very homogeneous matrix; in lower process temperatures, and higher production rates, counteracting the low bulk density of the carbon black; and in limiting extra handling and transport. Further, the feed in the first mixing zone is reduced in volume with a resultant increase in carbon black concentration and, thus, an increase in melt viscosity, which translates into higher shear stresses. Lower feed volume also results in longer mixing residence time. The upshot is improved dispersion. Resin feed in the second mixing zone also improves dispersion by lowering melt temperature thus increasing melt viscosity which results in higher dispersive stresses.

All molecular weights mentioned in this specification are weight average molecular weights unless otherwise designated.

The patents mentioned in this specification are incorporated by reference herein.

The invention is illustrated by the following examples.

EXAMPLES 1 to 21

The examples are carried out, using the process as described above and modifications thereof, on variations of either a Farrel™ Continuous Mixer or a Kobe™ LCM-G mixer. Each variation is described as follows:

Mixer A is a Farrel™ Production Size Continuous Mixer having 7/7 rotors and uneven rotor speed arrangement. This is the only setup in which the mixer discharges into a single-screw extruder. All subsequent machines use a melt pump for melt pressurization.

Mixer B is a Farrel™ Continuous Mixer having 7/7 rotors with an uneven rotor speed arrangement.

Mixer C is a Farrel™ Continuous Mixer having 7/7 rotors with an even speed, tip-to-heel rotor arrangement.

Mixer D is a Farrel™ Continuous Mixer having 7/7 rotors with an even speed, tip-to-tip rotor arrangement.

Mixer E is a Farrel™ Continuous Mixer having 7/15 rotors with an uneven speed rotor arrangement.

Mixer F is a Farrel™ Continuous Mixer having 7/15 rotors with an even speed, tip-to-heel rotor arrangement.

Mixer G is a Farrel™ Continuous Mixer having 15/15 rotors with an uneven speed rotor arrangement.

Mixer H is a Farrel™ Continuous Mixer having 15/15 rotors with an even speed, tip-to-heel rotor arrangement.

Mixer I is a Farrel™ Continuous Mixer UMSD fitted with #30 two stage rotors, one main feed port, and a vent port in the second stage.

Mixer J is a Kobe™ LCM-G mixer fitted with an E-2 type rotor.

The Farrel™ Continuous Mixer (FCM) and the Kobe™ Long Continuous Mixer (LCM) are counter-rotating non-intermeshing twin rotor mixers. A typical FCM or LCM rotor is composed of a conventional screw section which accepts a metered feed of solid resin, followed by a mixing section, where the material is compacted and molten before discharge. Both mixers provide a mechanism to control the amount of energy and mixing imparted into the polymer. This mechanism includes an adjustable vertical gate system and a melt pump (in case of the LCM) or removable fixed dams and a discharge gate system (in the case of the FCM). Two-stage rotor technology is available from both manufacturers. This technology incorporates a second screw section followed by a short mixing section before discharge.

An FCM also uses an adjustable dam between the first and second zone and can either discharge into a separate extruder or a melt pump for melt pressurization, filtering, and pelletizing. The LCM is generally coupled with a melt pump and is referred to as a Kobe™ LCM Gear Pump Pelletizing System. A visible difference is that, generally, the FCM uses a two-lobe rotor design, while the LCM uses a three lobe design.

Rotors are normally designed to achieve a given mixing intensity. This is obtained by changing the geometry of the mixing sections, such as using a solely reverse wing to hold and pump the material backward to force it to pass through high shear clearances, or a combination of forward and reverse wings, or also a reverse wing followed by a straight barrier section. The length of each section compared to its diameter (L/D) and the barrel/rotor clearances in the various sections are two other important design parameters.

A 7/7 rotor configuration in an FCM mixer refers to the use of a set of rotors #7. Rotor #7 is Farrel's base rotor which has a solid conveying section followed by a mixing section consisting of a forward and a reverse wing. Rotor #15 is more intensive, since, in addition to the configuration of #7, this rotor ends with a neutral straight section or barrier where the polymer mixture is forced to pass through a low clearance, high shear section for further mixing. Since the dam has no forwarding ability, it relies on upstream pumping to push the material forward. The dam is a high shear region to improve dispersion. As stated earlier, these rotors are non-intermeshing, so a lot of mixing takes place between the two rotors in the intermesh region (material transfer from one rotor to the other). Finally, both rotors have an apex point (encounter of forward and reverse wings), but the distance between the feed point and the apex point is shorter for #15 as compared to #7 rotors. Thus the material will see more mixing in #15 since melting is forced to occur earlier resulting in a longer melt-mixing action. This difference in apex distance will also increase material transfer in the axial direction.

Uneven terminology refers to the fact that the rotors can be set (interchangeable gear set-up) to rotate at different speeds, usually the driver rotor rotates at a slightly higher speed than the driven rotor. When the two rotors are set in an even speed arrangement, both rotors rotate at the same rpm. In this case another parameter is introduced, which is the angular position of one rotor versus the other. This is referred to as either tip-to-tip or tip-to-heel configurations.

The production methods described below can be grouped into two categories: The first is the traditional method, which uses a pre-compounded carbon black masterbatch to manufacture the final product. In this category, examples are given to illustrate the limits of such method in achieving the desired product quality while remaining within the limits of processing temperatures. A number of rotor designs have been tested to improve mixing and the results are presented. The second category uses the direct carbon black addition. In this method, no masterbatch is used and the carbon black is fed into the first mixing zone along with the polymer resin, either as a pure stream or as a pre-blended mastermix with the resin and the additive package. Melting and mixing of the polymer take place in the presence of carbon black as described above. Examples are given with and without additional solid resin feeding in the second zone. Results show the benefits of second zone feeding to obtain final product concentration and lower processing temperatures.

The various production methods are described below:

Production Method I is a two-step, masterbatch production method where the masterbatch is out-sourced to manufacture the finished product. The mixer discharges into a single screw extruder for melt pressurization, filtering, and pelletizing.

Production Method II is the same as Production Method I, i.e., it uses a pre-compounded masterbatch; however, the mixer here is coupled with a gear pump for melt pressurization and discharge.

Production Method III is a direct compounding single feed method. In this method, the carbon black is pre-tumbled with the base resin and fed as a mastermix into the main feed port. The balance of base resin is also fed into the main port. No resin is added in the second port.

Production Method IV is a direct compounding single feed method using raw carbon black. Here, the black is fed directly with no pre-tumbling with base resin prior to feed as was done in Production Method III. All of the resin required for composition balance is fed in the first feed port and none is added in the second port, thus the name "single feed".

Production Method V is a direct compounding split feed method. Here the carbon black is pre-tumbled with the base resin and fed into the mixer primary port. The resin balance is fed downstream into the second port. Note: additives can be fed into both the primary port and the second port.

The Production Methods are carried out for each example. The embodiments of the invention are found in examples 18 to 21. These embodiments can be referred to as the split feed approach. Examples 11 to 17 use the single feed approach. Variables and results are shown in the following Table.

TABLE

| P.M. | Ex's | Mixer | Temp (° C.) | SEI (HP-hr/lb) | S.R. | Agg. | Rate lbs/hr | MI g/10 min |
|---|---|---|---|---|---|---|---|---|
| I | 1 | A | 190 | .0870 | 883 | 33 | 12,500 | ? |
| II | 2 | B | 199 | .0979 | 620 | 394 | 1100 | — |
| II | 3 | C | 233 | .1023 | 788 | 121 | 1100 | — |
| II | 4 | D | 238 | .1174 | 868 | 60 | 1100 | — |
| II | 5 | E | 220 | .1071 | 803 | 144 | 1100 | — |
| II | 5A | E | 221 | .1023 | 852 | 0 | 800 | ? |
| II | 6 | F | 217 | .1027 | 776 | 169 | 1100 | — |
| II | 7 | F | 219 | .1049 | 772 | 182 | 1100 | — |
| II | 8 | G | 221 | .1048 | 840 | 48 | 1100 | — |
| II | 9 | G | 222 | .1073 | 861 | 31 | 1100 | — |
| II | 9A | G | 248 | .1232 | 903 | 14 | 800 | ? |
| II | 10 | H | 217 | .1027 | 776 | 169 | 1100 | — |
| II | 11 | I | 278 | .1443 | 906 | 10 | 614 | 0.576 |
| II | 12 | J | 256 | — | 897 | 5 | 800 | 0.555 |
| III | 13 | I | 300 | .1591 | 908 | 10 | 614 | 0.561 |
| III | 14 | I | 286 | .1456 | 910 | 9 | 614 | 0.545 |
| III | 15 | J | 246 | — | 901 | 14 | 800 | 0.536 |
| IV | 16 | J | 275 | — | 898 | 9 | 800 | 0.492 |
| IV | 17 | J | 275 | — | 910 | 7 | 400 | 0.493 |
| V | 18 | I | 248 | .1173 | 909 | 17 | 614 | 0.598 |
| V | 19 | I | 226 | .0988 | 908 | 29 | 850 | ? |
| V | 20 | I | 239 | .1132 | 912 | 10 | 850 | 0.597 |
| V | 21 | J | 229 | — | 903 | 0 | 800 | 0.550 |

Notes to Table:
1. P.M.=Production Method
2. Ex's.=examples
3. Temp. (° C.)=discharge temperature. For thermal stability and long term aging properties, this temperature should not exceed 230 to 260° C., depending on the product. It is preferably kept below 230° C. for low density polyethylene based compounds.
4. SEI (HP-hr/lb)=Specific energy input, in horsepower-hour per pound, is a quantity used to express the amount of energy imparted to the resin. It is also a measure of the intensity of mixing and is used in the specification of machine power requirements.

5. S.R.=streak rating.This is a measure of the product mixing quality and is a result of microscopic analysis. A higher S.R. means a better product.

6. Agg.=total agglomerates. This quantity gives an indication of the degree of dispersion of the solid particulates.

7. Rate=production rate in pounds per hour.

8. MI=melt index in grams per 10 minutes.

I. Comparing example 18, an embodiment of the invention, with example 11, it is seen that the streak ratings are virtually the same, i.e., 909 and 906 are within the standard deviation. Even though example 11 has a slightly lower agglomerates count, i.e., 10 vs. 17 (both within product specifications); however, the discharge temperature of example 18 (248° C.) is appreciably lower than that of example 11 (278° C.). This lower discharge temperature together with the streak rating above 900 indicates that the example 18 process is superior to the process of example 11.

II. Comparing example 21, an embodiment of the invention, with example 15, again the streak ratings are virtually the same; however, note the reduction in agglomerates to zero in example 21 as opposed to an agglomerates number of 14 in example 15.

III. Comparing examples 19 and 20 with example 18, all embodiments of the invention, example 18 is run at a rate of 614 pounds per hour while examples 19 and 20 are both run at a 38 percent higher rate of 850 pounds per hour. Again, the streak ratings are virtually the same and the agglomerates numbers are, respectively, 29 and 10, as opposed to 17 for example 18. However, the discharge temperature for example 18 is 248 degrees C. while the discharge temperatures for examples 19 and 20 are, respectively, 226 and 239 degrees C. This indicates that one can run at higher rates and reduce the discharge temperatures substantially without compromising streak ratings and agglomerates numbers.

IV. Example 16, when run at a rate of 800 pounds per hour, obtains a streak rating of 898 and an agglomerates number of 9 at a discharge temperature of 275 degrees C. while example 17, when run at a rate of 400 pounds per hour obtains a streak rating of 910 and an agglomerates number of 7 at a discharge temperature of 275 degrees C. This indicates that, in the single feed approach, a significant reduction in rate is necessary to achieve the values of the split feed approach.

V. Examples 2 through 10 illustrate attempts to improve the above values by changing rotor configuration and geometry to affect mixing intensity while maintaining the discharge temperature as close to 220 degrees C. as possible. While increasing discharge temperatures as in examples 2, 3, and 4 is helpful, streak ratings are well below 900 (range=620 to 868) and agglomerate numbers are high (range=31 to 394). Example 9A shows the mixing performance of the classical single feed masterbatch method at 800 pounds per hour using the highest intensity, single-stage rotors (#15/15). The data show it is possible to achieve a good mixing performance (S.R.=903), however at the expense of a high melt temperature (248° C.). To reduce the temperature, an intermediate rotor configuration is used (#7/15) as shown in example 5A. At the same production rate of 800 pounds per hour, the temperature is lowered to 221 degrees C., however, at a loss in mixing performance as shown by a drop in the streak rating value (S.R.=852), well below product specifications. It should be noted that the runs above used a masterbatch, pre-compounded on a separate machine.

VI. In examples 11, 13, and 14, rotor intensity is increased by using two stage, longer rotors. Both streak ratings and agglomerate numbers are much improved; however, discharge temperatures are excessively high in the 278 to 300 degree C. range., a disadvantage, and the same can be said about runs 12, 15, and 16 on the Kobe™ mixer. Note the much lower discharge temperature in examples 18 to 20.

VII. It is also noted that example 21, an embodiment of the invention, using the split feed approach, is able to obtain a higher melt index than examples 15, 16, and 17, which use the single feed approach, even though the mixers are otherwise similar to each other.

What is claimed is:

1. A process for the preparation of a composition useful in telecommunications jacketing comprising:

(i) introducing a polyolefin into the first mixing zone of a melt/mixer having first and second mixing zones;

(ii) introducing particulate carbon black per se or a premix of said carbon black and polyolefin into the first mixing zone, said carbon black being in an amount of about 2 to about 50 percent based on the weight of the polyolefin introduced into the first mixing zone;

(iii) melting the polyolefin in the presence of the carbon black in the first mixing zone;

(iv) mixing the carbon black and the molten polyolefin in the first mixing zone to provide a molten mixture;

(v) passing the molten mixture from step (iv) into the second mixing zone;

(vi) adding sufficient polyolefin to the molten mixture from step (v) to dilute the carbon black to a level of about 2 to about 3 percent by weight based on the weight of the total polyolefin in the melt/mixer;

(vii) mixing the added polyolefin with the molten mixture in the second mixing zone to provide a molten mixture;

(viii) simultaneously with step (vii), venting the second mixing zone;

(ix) recovering the mixture from step (vii); and (x) optionally, pelletizing the mixture from step (ix).

2. The process defined in claim 1 wherein the polyolefin is polyethylene, polypropylene, or mixtures thereof.

3. The process defined in claim 1 wherein the carbon black has a surface area in the range of about 20 to about 1500 square meters per gram.

4. The process defined in claim 1 wherein the feed rate of polyolefin to the mixing zones in the range of about 400 to about 100,000 pounds per hour.

5. The process defined in claim 1 wherein the amount of carbon black introduced in step (ii) is in the range of about 5 to about 15 percent by weight based on the weight of the polyolefin.

6. The process defined in claim 1 wherein the amount of polyolefin introduced in step (vi) is in the range of about 25 to about 80 percent by weight based on the total weight of the polyolefin in the process.

7. The process defined in claim 1 wherein the mixing speeds in steps (iv) and (vii) are in the range of about 150 to about 500 rpm.

8. A process for the preparation of a composition useful in telecommunications jacketing comprising:

(i) introducing a polyolefin selected from the group consisting of polyethylene, polypropylene, or mixtures thereof into the first mixing zone of a melt/mixer having first and second mixing zones;

(ii) introducing particulate carbon black, each particle having a surface area in the range of about 20 to about 1500 square meters per gram into the first mixing zone, in an amount of about 5 to about 15 percent by weight based on the weight of the polyolefin introduced into the first mixing zone;

(iii) melting the polyolefin in the presence of the carbon black in the first mixing zone;

(iv) simultaneously mixing the carbon black and the molten polyolefin in the first mixing zone to provide a molten mixture;

(v) passing the molten mixture from step (iv) into the second mixing zone;

(vi) adding polyolefin in an amount of about 25 to about 80 percent by weight based on the total weight of polyolefin in the melt/mixer to the molten mixture from step (v) to dilute the carbon black to a level of about 2 to about 3 percent by weight based on the weight of the total polyolefin in the melt/mixer;

(vii) mixing the added polyolefin with the molten mixture in the second mixing zone to provide a molten mixture;

(viii) simultaneously with step (vii), venting the second mixing zone;

(ix) recovering the mixture from step (vii); and (x) optionally, pelletizing the mixture from step (ix) with the provisos that (a) the feed rate of polyolefin to the mixing zones is in the range of about 400 to about 100,000 pounds per hour and (b) the mixing speeds in steps (iv) and (vii) are in the range of about 150 to about 500 rpm.

* * * * *